(12) United States Patent
Hanes et al.

(10) Patent No.: US 8,514,700 B2
(45) Date of Patent: Aug. 20, 2013

(54) MLPPP OCCUPANCY BASED ROUND ROBIN

(75) Inventors: Gordon Hanes, Ottawa (CA); Adrian Alfred Ellsworth, Stittsville (CA); Michel Rochon, Kanata (CA)

(73) Assignee: Alcatel Lucent, Paris (FR)

( * ) Notice: Subject to any disclaimer, the term of this patent is extended or adjusted under 35 U.S.C. 154(b) by 197 days.

(21) Appl. No.: 12/915,790

(22) Filed: Oct. 29, 2010

(65) Prior Publication Data

US 2012/0106567 A1    May 3, 2012

(51) Int. Cl.
| | |
|---|---|
| *H04L 12/26* | (2006.01) |
| *H04L 12/403* | (2006.01) |
| *H04L 12/56* | (2006.01) |
| *G06F 15/16* | (2006.01) |
| *G06F 15/173* | (2006.01) |

(52) U.S. Cl.
USPC ...... 370/230; 370/235; 370/395.41; 370/417; 370/449; 709/230; 709/238

(58) Field of Classification Search
USPC ............... 370/230, 235, 395.41, 417, 449; 709/230, 238
See application file for complete search history.

(56) References Cited

U.S. PATENT DOCUMENTS

| | | | | |
|---|---|---|---|---|
| 6,178,448 B1* | 1/2001 | Gray et al. | | 709/224 |
| 6,260,071 B1* | 7/2001 | Armistead et al. | | 709/238 |
| 6,529,959 B1* | 3/2003 | Armistead et al. | | 709/238 |
| 6,549,540 B1* | 4/2003 | Ward | | 370/412 |
| 6,646,991 B1* | 11/2003 | Drottar et al. | | 370/238 |
| 6,687,840 B1* | 2/2004 | Drottar et al. | | 713/401 |
| 6,778,495 B1* | 8/2004 | Blair | | 370/230 |
| 6,862,618 B1* | 3/2005 | Gray et al. | | 709/224 |
| 7,206,955 B2* | 4/2007 | Drottar et al. | | 713/401 |
| 7,394,766 B2* | 7/2008 | Drottar et al. | | 370/238 |
| 7,493,411 B1* | 2/2009 | Armistead et al. | | 709/238 |
| 7,586,918 B2* | 9/2009 | Levy et al. | | 370/395.1 |
| 7,613,110 B1* | 11/2009 | Blair | | 370/230 |
| 7,787,370 B1* | 8/2010 | Aweya et al. | | 370/230 |
| 7,787,496 B1* | 8/2010 | Singh et al. | | 370/474 |
| 2002/0010866 A1* | 1/2002 | McCullough et al. | | 713/201 |
| 2003/0108063 A1* | 6/2003 | Joseph et al. | | 370/465 |
| 2006/0140197 A1* | 6/2006 | Robinson et al. | | 370/401 |
| 2006/0203804 A1* | 9/2006 | Whitmore et al. | | 370/352 |
| 2007/0258461 A1* | 11/2007 | Phadnis et al. | | 370/395.21 |
| 2008/0205287 A1* | 8/2008 | Kuhl et al. | | 370/252 |
| 2009/0016267 A1* | 1/2009 | Otsubo et al. | | 370/328 |
| 2009/0147765 A1* | 6/2009 | Chen et al. | | 370/345 |
| 2009/0245246 A1* | 10/2009 | Veeragandham et al. | | 370/389 |
| 2009/0262747 A1* | 10/2009 | Nakagawa | | 370/412 |
| 2009/0285108 A1* | 11/2009 | Venugopal et al. | | 370/252 |
| 2011/0051604 A1* | 3/2011 | Nishimura | | 370/235 |
| 2011/0069717 A1* | 3/2011 | Osano et al. | | 370/415 |
| 2011/0123194 A1* | 5/2011 | Sisto et al. | | 398/58 |
| 2011/0149977 A1* | 6/2011 | Thomas et al. | | 370/395.41 |
| 2011/0182292 A1* | 7/2011 | Ronciak et al. | | 370/392 |
| 2011/0231588 A1* | 9/2011 | Meredith | | 710/110 |
| 2012/0039173 A1* | 2/2012 | Danzig et al. | | 370/235.1 |

* cited by examiner

*Primary Examiner* — Alpus H Hsu
(74) *Attorney, Agent, or Firm* — Kramer & Amado P.C.

(57) ABSTRACT

Embodiments of the invention are directed to providing a method for selecting a link for transmitting a data packet, from links of a Multi-Link Point-to-Point Protocol (MLPPP) bundle, by compiling a list of links having a minimum queue depth and selecting the link in a round robin manner from the list. Some embodiments of the invention further provide for a flag to indicate if the selected link has been assigned to a transmitter so that an appropriate link will be selected even if link queue depth status is not current.

20 Claims, 2 Drawing Sheets

MLPPP OCCUPANCY BASED ROUND ROBIN

FIELD OF THE INVENTION

The invention is directed to packet switching communication networks, particularly to distributing data packet fragments among links of a bundle of Multi-Link Point to Point Protocol (MLPPP) interfaces in a packet switching network.

BACKGROUND OF THE INVENTION

Multi-Link Point to Point Protocol (MLPPP) is used to aggregate the bandwidth of several lower speed links to effectively provide a single higher speed link, along with low delay, low jitter and maintain the order of packets. IP packets of a traffic flow to be carried over the MLPPP (higher speed) link are distributed across the lower speed links at the transmitting end of the MLPPP link by fragmenting whole PPP frames and sending the fragments over different physical links also called MLPPP links. MLPPP is formally known as PPP Multilink Protocol, but is also known as ML PPP, PPP-MP, PPP-MLP, MPPP and as defined in IETF RFC1990 which specifies that fragments of a packet are to be distributed to the link transmit queues on the basis of the least occupied queue. That is, the occupancy (fill level in bytes) of each queue is determined and the current fragment of a packet to be transmitted is inserted into the queue with the lowest occupancy.

Generally, the aforementioned approach works well. However, in practice, many IP data switches use data memory with linked list pointers to implement data queues. In these scenarios, the data queues can be implemented in blocks of X bytes (e.g. 64 bytes) in which case the link transmit queue occupancy is often measured in terms of blocks. Link transmit queue occupancy of several queues could be equal in terms of blocks when in fact their actual occupancy measured in bytes can be different. Additionally, the block management process updates the queue occupancy in a finite amount of time, which introduces latency in available queue occupancy information. When packets are processed back-to-back, the packet fragments in a MLPPP bundle can be assigned to links faster than the true occupancy of each link can be determined, which can prevent the system from utilizing the appropriate link.

Therefore, in such cases, an improved means for determining which link should be selected for the current packet fragment for transmission is highly desirable.

SUMMARY OF THE INVENTION

In general terms, embodiments of the present invention determine the occupancy of the MLPPP link transmit queues in terms of blocks (X bytes), as dictated by hardware limitations of the system. Where multiple queues have the same level occupancy and it is the equivalent lowest level, packets are distributed to those queues at the lowest level in a round-robin manner. These embodiments can minimize packet transfer delay, differential delay, and packet delay variation across the links that comprise the MLPPP link.

An embodiment of the present invention is directed to providing a method of selecting a link (selected link) for transmitting a data packet, from a plurality of links of a Multi-Link Point-to-Point Protocol (MLPPP) bundle. The method comprises steps of: compiling a first list of active links from the plurality of links in the MLPPP bundle; compiling from the first list, a second list of links having a minimum queue depth; and if the second list has more than one member, the selected link is selected in a round robin manner.

In some embodiments of the present invention, the round robin manner comprises addressing the links in a circular sequence and wherein the selected link comprises the link following a previously-selected link in the sequence.

Some embodiments of the present invention further comprise steps of: setting a flag associated with the selected link when assigning the data packet for transmission on the selected link; and reading the flag when selecting the selected link, wherein, if the flag is not set, the selected link comprises the previously-selected link in the sequence.

Some embodiments of the present invention further comprise a step of determining if at least one link in the first list has a queue depth below its respective link queue threshold, and if so, restricting the first list to links having a queue depth below their respective link queue threshold.

In some embodiments of the present invention, the packet comprises a fragment of a larger packet.

Another aspect of the present invention provides a program storage device readable by a machine, tangibly embodying a program of instructions executable by the machine to perform the method steps described above.

BRIEF DESCRIPTION OF THE DRAWINGS

Some embodiments of apparatus and/or methods in accordance with embodiments of the present invention are now described, by way of example only, and with reference to the accompanying drawings in which.

In the figures like features are denoted by like reference characters.

DETAILED DESCRIPTION

Figure 1:
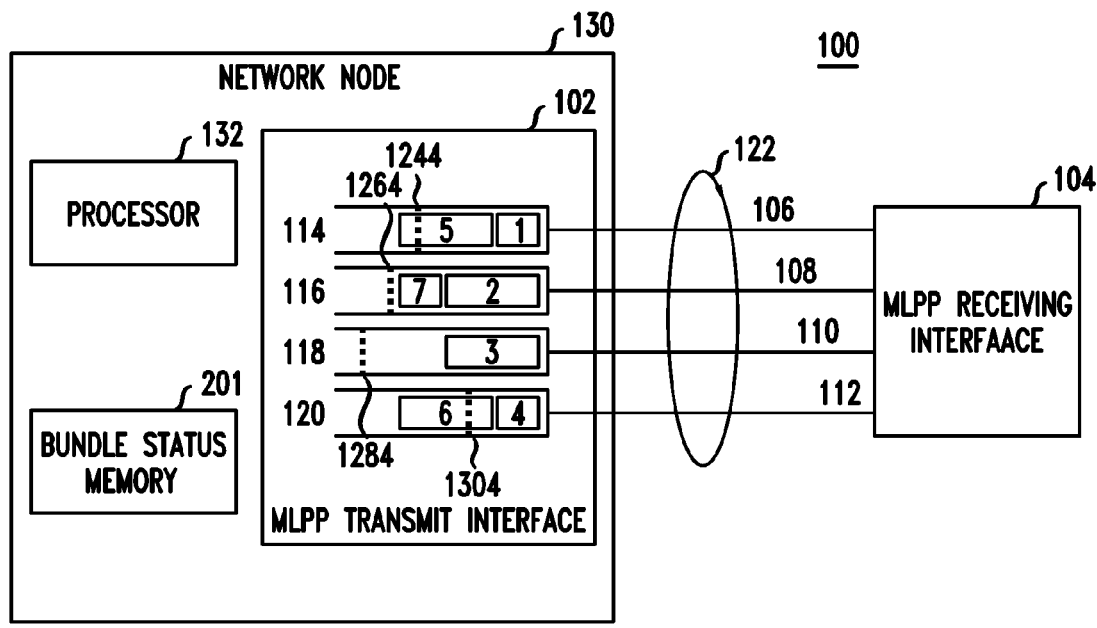
FIG. 1 illustrates an arrangement of transmit data queues in a MLPPP bundle according to an embodiment of the present invention.

FIG. 1 conceptually depicts a telecommunication system 100 including a network node 130 having a processor 132, a bundle status memory 201, and an MLPPP transmit interface 102, and a corresponding MLPPP receiving interface 104, typically on a different network node. The MLPPP transmit interface is configured as a bundle of links 106, 108, 110, 112 each with corresponding transmit queues 114, 116, 118, 120, respectively. Each transmit queue 114, 116, 118, 120 has a configurable queue threshold illustrated by dashed lines 124, 126, 128, 130 respectively. The queue thresholds can be set higher for higher speed links for example, or set lower for lower latency such as for the case where an individual link is selected for transmitting control plane data in addition to being configured as part of an MLPPP bundle.

MLPPP can optionally support fragmentation of packets to better utilize bandwidth of the links in the MLPPP bundle. Thus large packets can be fragmented into packet fragments, each of which can be transmitted over individual links. Embodiments of the present invention support both packets and packet fragments. Packets (or packet fragments) 1, 2, 3, 4, 5, 6, 7 are transmitted on links having the lowest transmit queue depth so as to distribute the packet traffic across all the configure d links to maximize throughput and minimize latency.

Thus, packet fragment 1 is en-queued on transmit queue 114 for transmission on link 106. FIG. 1 illustrates that packet fragment 1 is the first packet fragment for transmission on link 106, with no other packet fragments pending for transmission on that link. Similarly, packet fragment 2 is en-queued on transmit queue 116 for transmission on link 108, packet fragment 3 is en-queued on transmit queue 118 for transmission on link 110 and packet fragment 4 is en-queued on transmit queue 120 for transmission on link 112. The round robin aspect is illustrated by the circular arrow 122.

The round robin process is intended to break ties for load-balanced links. The function is two-fold: In a situation where a bundle has very low traffic, there may be no packets queued for any of the links, in which case the round robin algorithm will ensure that each link will have a turn at sending a packet so that all links will be used. In a fragmentation application, a packet is split up into smaller packets. The queue depth update mechanism cannot always update the whole chain of memories to the current values in real time before the next fragment is requesting assignment to a bundle member. The round robin process will bump the start point for link selection if a link has been polled since the last round robin update and will not if it has not been polled, thus preventing "phantom jumps" in the assigned link.

Table 1 illustrates a Bundle Status Memory (BSM) table. The BSM holds the state information for the links of each MLPPP bundle, including whether a link is valid (configured as part of the bundle), the depth of the link transmit queue buffer, and whether the link is in back pressure. The BSM is indexed by the Bundle ID field which is configured to address up to N (e.g., 512) MLPPP bundles, identified by their Bundle ID. For ease of description, in the described embodiment, the BSM is configured to handle up to 16 links per bundle, thus the Link Valid state can be represented by a 16-bit field with each bit representing a corresponding link and each valid link represented by a "1". Note that other embodiments of the present invention contemplates other numbers of links to be supported. For ease of description, in the described embodiment, the queue depth of each link is measured in blocks of 40 bytes and the queue depth of 63 blocks can be represented by 6 bits, thus the Link Depth field can be represented by 16×6 bits. The Back Pressure field indicates whether a link is in back pressure which is defined as having a queue depth exceeding a predefined threshold for the link. Typically, when the queue for a particular link exceeds the queue threshold, it is an indication that packets are arriving faster than they can be transmitted and a "backpressure" flag is set.

TABLE 1

| | Bundle Status Memory (BSM) | | |
|---|---|---|---|
| Bundle ID | Link Valid (16 columns of 1 bit) | Link Depths (16 columns of 6 bits) | Back Pressure (16 columns of 1 bit) |
| 1 | | | |
| 2 | | | |
| ... | | | |
| 512 | | | |

Table 2 illustrates a Minimum Depth Memory (MDM) table, which stores the link ID of the link of each MLPPP bundle which is selected as the best link ("Selected Link ID") for transmitting the next packet or packet fragment for the MLPPP bundle. This is the link with the minimum queue depth at the time of the event, or in the case of more than one link having the same minimum queue depth, the link selected by a round robin process as the best link for transmitting the next packet or packet fragment for the MLPPP bundle. The Polled Bit indicates whether the MDM has been accessed and the selected link has been assigned to transmit the next packet or packet fragment.

TABLE 2

| | Minimum Depth Memory (MDM) | |
|---|---|---|
| Bundle ID | Polled Bit | Selected Link ID |
| 1 | | |
| 2 | | |
| ... | | |
| 512 | | |

Figure 2:
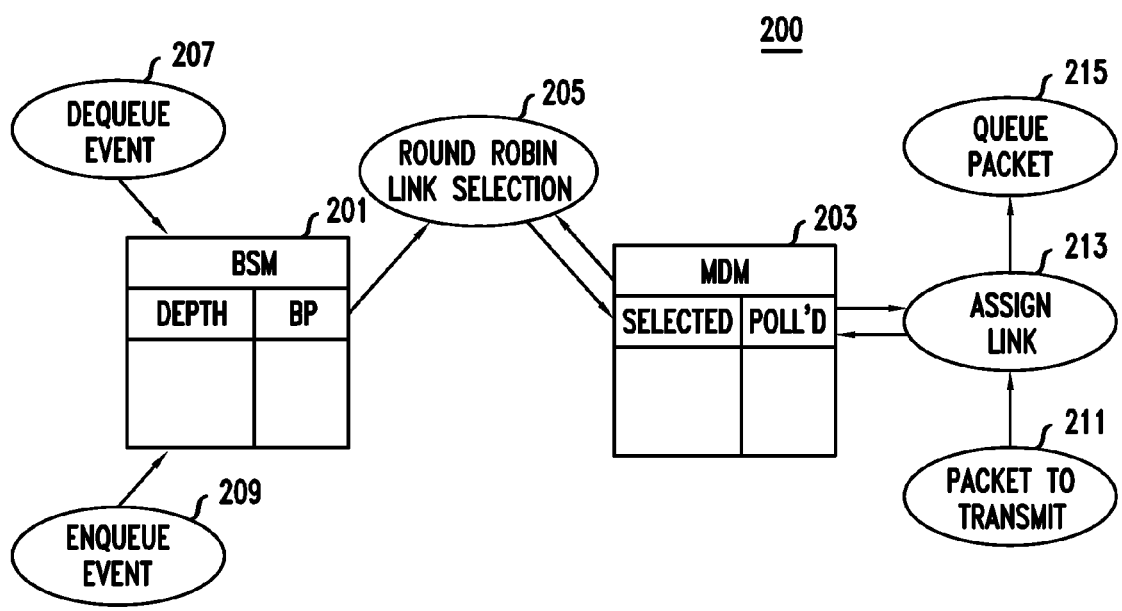
FIG. 2 illustrates the relationship between data tables and the process of embodiments of the present invention.

FIG. 2, illustrates the relationship between BSM 201 and MDM 203 and the processes which read or update them, thus a dequeue event 207 which remove a packet fragment from a link transmit queue buffer for transmitting it, or an enqueue event 209 which would add an incoming packet or packet fragment to be transmitted, would trigger an update to BSM 201. The round robin link selection process 205 reads the queue depths from BSM 201 and reads the polled bit from MDM 203 and updates the Selected Link ID of MDM 203, as described below with reference to FIG. 3. When the system has a packet or packet fragment to transmit (211) for a MLPPP bundle, a link is assigned (213) by reading the Selected Link for the bundle from MDM 203 and then setting the Polled it for the bundle. The Polled bit thus indicates that the Selected Link has been used (assigned) and if the round robin process accesses the MDM 203 for a subsequent packet or fragment before the BSM 201 can be updated, then the round robin process will consider selecting a different link at step 326 described below. Thus the step 213 will trigger the load balance process 300 described below. ("round robin" process which will update selected links in MDM 203). After the Selected link is assigned, the system then queues the packet or packet fragment in the appropriate queue for transmission (215). Thus event 215 is an enqueue event, which triggers (209) an update of BSM 201. A single packet or fragment can generate several (e.g., 5-20 or more) enqueues and dequeues, as well as a MDM read event and each event can cause a recalculation of the selected link in the BSM 201. This means a full packet need not be transmitted before the link it is being transmitted on could become the selected link. A packet or fragment stays in the queue until it reaches the head of the transmit queue (which is typically a fifo buffer), then bytes from the packet or fragment are transmitted on the link.

Figure 3:
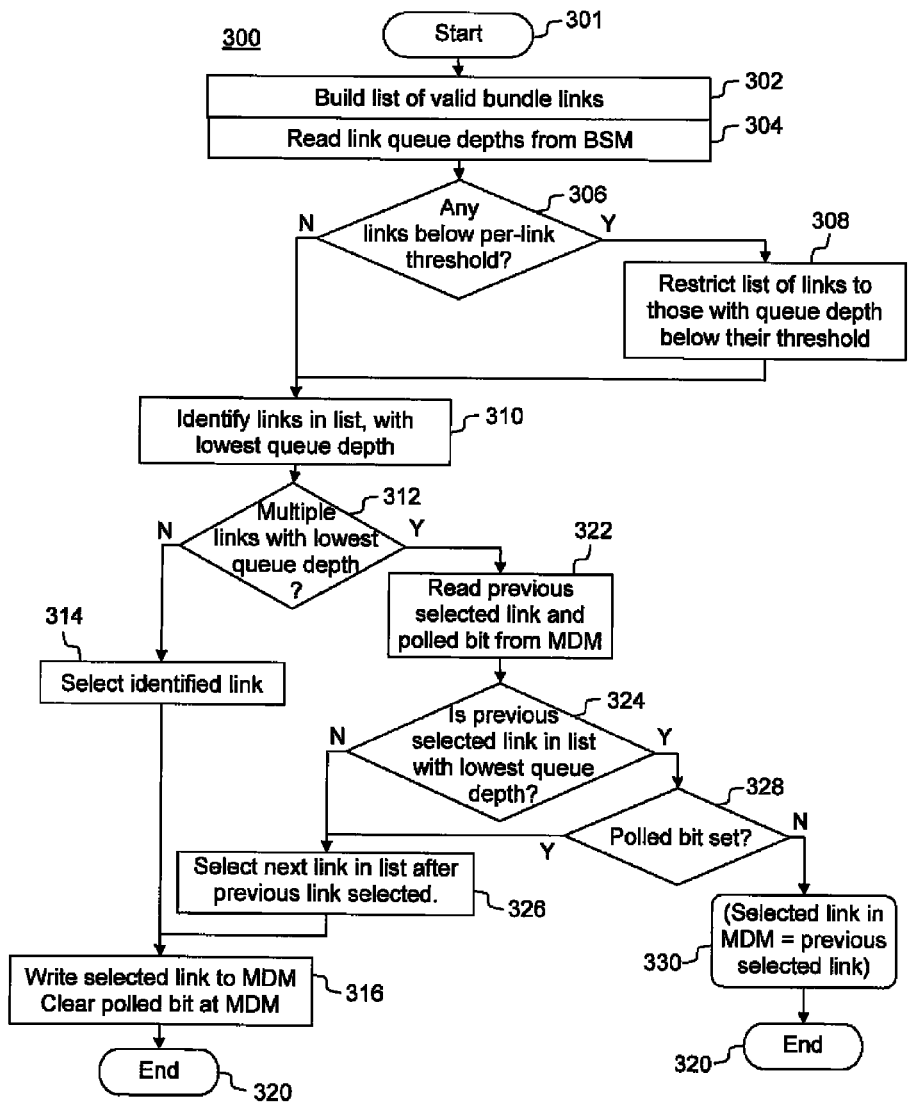
FIG. 3 illustrates a flowchart of a method for distributing data packet fragments in a MLPPP bundle according to an embodiment of the invention.

Referring to FIG. 3, the load balance process 300 starts at step 301 and is triggered by an event that updates the queue depth information in BSM 201 such as an enqueue event 209 or dequeue event 207 for any link in the bundle, or by assigning the selected link (213) which updates the polled status bit in MDM 203. Note that the same link could be reselected at this step. These trigger events mean that the determination of the selected link and the polled status bit in MDM 203 needs to be reassessed. At step 302, the system builds a list of valid bundle links from BSM 201. At step 304, the system reads the link queue depths of the links configured for the MLPPP bundle from the BSM 201. At step 306, the process determines if there are any links in the MLPPP bundle that have a queue depth below its respective threshold. This can be determined from the backpressure bit (BP) for each link in the BSM. If at least one link has a queue depth below its respective threshold, then the process proceeds to step 308, where the list of valid links is restricted to those links with a queue depth below their respective thresholds. This is useful when links have different thresholds, such as if one or more links have a low threshold so that they can be more responsive for use as a link for handling control signals for example. This helps keep these links from becoming congested unnecessarily while still being available for MLPPP bundles. If at step 306, it is determined that no links have a queue depth below their respective threshold, then the process continues to step 310 with the list of links intact. That is, all the links from step 302 are still in consideration.

At step 310, the system identifies which links have the lowest queue depth. At step 312 the system determines if more than one link has the lowest queue depth. If only one link has the lowest queue depth then at step 314 it is selected for transmitting the pending packet fragment and at step 316 the system writes the selected link ID to MDM 203 and clears the corresponding polled status bit on MDM 203. The process ends at step 320.

If more than one link has the lowest queue depth, then the process proceeds to step 322 where the system reads the previous selected link and polled status bit link from the MDM memory. At step 324, the system determines if the previous selected link is still in the list of links having the lowest queue depths (which is a subset of the list of valid links) and if not, the process proceeds to step 326 where the system selects the next link in the list after the previous selected link in round robin fashion, and the process then continues to step 316 previously described above. If at step 324, the system determines that previous selected link is in the list of links having the lowest queue depths, then the process proceeds to step 328 which determines if the polled status bit is set, and if it is, the process proceeds to step 326 previously described above. If at step 328 it is determined that the polled status bit is not set, then the MDM 203 remains unchanged and the selected link in MDM 203 will be the previous selected link (indicated by box 330) and the process stops at step 320. Thus the process 300 updates the MDM 203 so that when the system needs to assign a pending packet of step 213 to a bundle member or link, the system reads the selected link from the MDM 203.

The round robin arbitration process is intended to break ties for load balanced links. The method can have advantages in cases of low traffic and high traffic. In the situation where a bundle has very low traffic, there may be no packets in memory for any of the links of a MLPP bundle. The round robin arbitration process will ensure that each link will have a turn at sending a packet fragment so that traffic load is balanced over all the links. Ensuring a more even distribution of sparse traffic can also accelerate detection of links that are down and reduce the transmission time of a packet when a packet is fragment.

In high traffic scenarios, packets can be fragmented, i.e. split up into smaller packets or fragments. This fragmentation is supported by MLPPP RFC 1990. In high traffic scenarios with very small time intervals between packets or fragments, the queue depth update mechanism can not always update the whole chain of memories to reflect the actual current queue depths for all the links and it is possible that process 300 could be executed multiple times before the queue depth information for each link can be updated.

There is value in selecting the least occupied link to avoid introducing unnecessary delays and jitter and possibly even packet loss at the MLPPP on the receiving link in cases where the receiver wouldn't have enough buffers to process the packets or packet fragments and perform packet re-ordering, depending on the MLPPP receiver on the other end.

A person of skill in the art would readily recognize that steps of various above-described methods can be performed by programmed computers. Herein, some embodiments are also intended to cover program storage devices, e.g., digital data storage media, which are machine or computer-readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Numerous modifications, variations and adaptations may be made to the embodiment of the invention described above without departing from the scope of the invention, which is defined in the claims.

What is claimed is:

1. A method of selecting a link for transmitting a data packet, from a plurality of links of a Multi-Link Point-to-Point Protocol (MLPPP) bundle, the method comprising steps of:
   compiling a first list of active links from said plurality of links in said MLPPP bundle;
   compiling from said first list, a second list of links having a minimum queue depth;
   based on said second list having more than one member, applying a round robin scheduling algorithm to the second list to identify a link of the second list as the selected link; and
   enqueuing the packet in an output queue associated with the selected link.

2. The method of claim 1, wherein said round robin scheduling algorithm comprises addressing a plurality of links of the second list in a circular sequence and wherein said selected link comprises the link following a previously-selected link in said sequence.

3. The method of claim 2, further comprising steps of:
   setting a flag associated with said selected link when assigning said data packet for transmission on said selected link; and
   reading said flag when selecting said selected link,
   wherein, if said flag is not set, said selected link comprises said previously-selected link in said sequence.

4. The method of claim 2, further comprising a step of determining if at least one link in said first list has a queue depth below its respective link queue threshold, and if so, restricting said first list to links having a queue depth below their respective link queue threshold.

5. The method of claim 1, wherein said data packet comprises a fragment of a larger data packet.

6. The method of claim 1, further comprising:
   determining whether a previously selected link has been polled since a previous round robin update; and
   wherein the round robin scheduling algorithm selects the previous selected link as the selected link based on the previous selected link having been polled since a previous round robin update.

7. The method of claim 1, wherein compiling from said first list a second list of links having a minimum queue depth comprising reading the queue depths for the plurality of links from a bundle status memory (BSM).

8. A non-transitory machine-readable storage medium encoded with instructions for selecting a link for transmitting a data packet, from a plurality of links of a Multi-Link Point-to-Point Protocol (MLPPP) bundle, the medium comprising:
   instructions for compiling a first list of active links from said plurality of links in said MLPPP bundle;
   instructions for compiling from said first list, a second list of links having a minimum queue depth;
   instructions for based on said second list having more than one member, applying a round robin scheduling algorithm to the second list to identify a link of the second list as the selected link; and
   instructions for enqueuing the packet in an output queue associated with the selected link.

9. The non-transitory machine-readable storage medium of claim 8, wherein said round robin scheduling algorithm comprises addressing a plurality of links of the second list in a circular sequence and wherein said selected link comprises the link following a previously-selected link in said sequence.

10. The non-transitory machine-readable storage medium of claim 9, further comprising:
    instructions for setting a flag associated with said selected link when assigning said data packet for transmission on said selected link; and
    instructions for reading said flag when selecting said selected link,
    wherein, if said flag is not set, said selected link comprises said previously-selected link in said sequence.

11. The non-transitory machine-readable storage medium of claim 9, further comprising instructions for determining if at least one link in said first list has a queue depth below its respective link queue threshold, and if so, restricting said first list to links having a queue depth below their respective link queue threshold.

12. The non-transitory machine-readable storage medium of claim 8, wherein said data packet comprises a fragment of a larger data packet.

13. The non-transitory machine-readable storage medium of claim 8, further comprising:
    instructions for determining whether a previously selected link has been polled since a previous round robin update; and
    wherein the round robin scheduling algorithm selects the previous selected link as the selected link based on the previous selected link having been polled since a previous round robin update.

14. A network node for transmitting a data packet over a link of a plurality of links of a Multi-Link Point-to-Point Protocol (MLPPP) bundle, the network node comprising:
    a plurality of output queues, including a first output queue associated with a first link of the plurality of links; and
    a processor configured to:
      compile a first list of active links from said plurality of links in said MLPPP bundle,
      compile from said first list, a second list of links having a minimum queue depth,
      based on said second list having more than one member, apply a round robin scheduling algorithm to the second list to identify the first link as the selected line, and enqueue the packet in the first output queue.

15. The network node of claim 14, wherein said round robin scheduling algorithm comprises addressing a plurality of links of the second list in a circular sequence and wherein said selected link comprises the link following a previously-selected link in said sequence.

16. The network node of claim 15, wherein the processor is further configured to:
    set a flag associated with said selected link when assigning said data packet for transmission on said selected link; and
    read said flag when selecting said selected link,
    wherein, if said flag is not set, said selected link comprises said previously-selected link in said sequence.

17. The network node of claim 15, wherein the processor is further configured to determine if at least one link in said first list has a queue depth below its respective link queue threshold, and if so, restricting said first list to links having a queue depth below their respective link queue threshold.

18. The network node of claim 14, wherein said data packet comprises a fragment of a larger data packet.

19. The network node of claim 14, wherein the processor is further configured to:
    determine whether a previously selected link has been polled since a previous round robin update; and wherein the round robin scheduling algorithm selects the previous selected link as the selected link based on the previous selected link having been polled since a previous round robin update.

20. The network node of claim 14, further comprising a bundle status memory (BSM) configured to store queue depths for the plurality of output queues wherein, in compiling from said first list, a second list of links having a minimum queue depth, the processor is configured to read the queue depths from the BSM.

* * * * *